G. M. CAGLE.
ROTARY SCALE.
APPLICATION FILED MAY 15, 1917.

1,257,186.

Patented Feb. 19, 1918.
4 SHEETS—SHEET 3.

WITNESSES

INVENTOR
G. M. Cagle,
BY Victor J. Evans
ATTORNEY

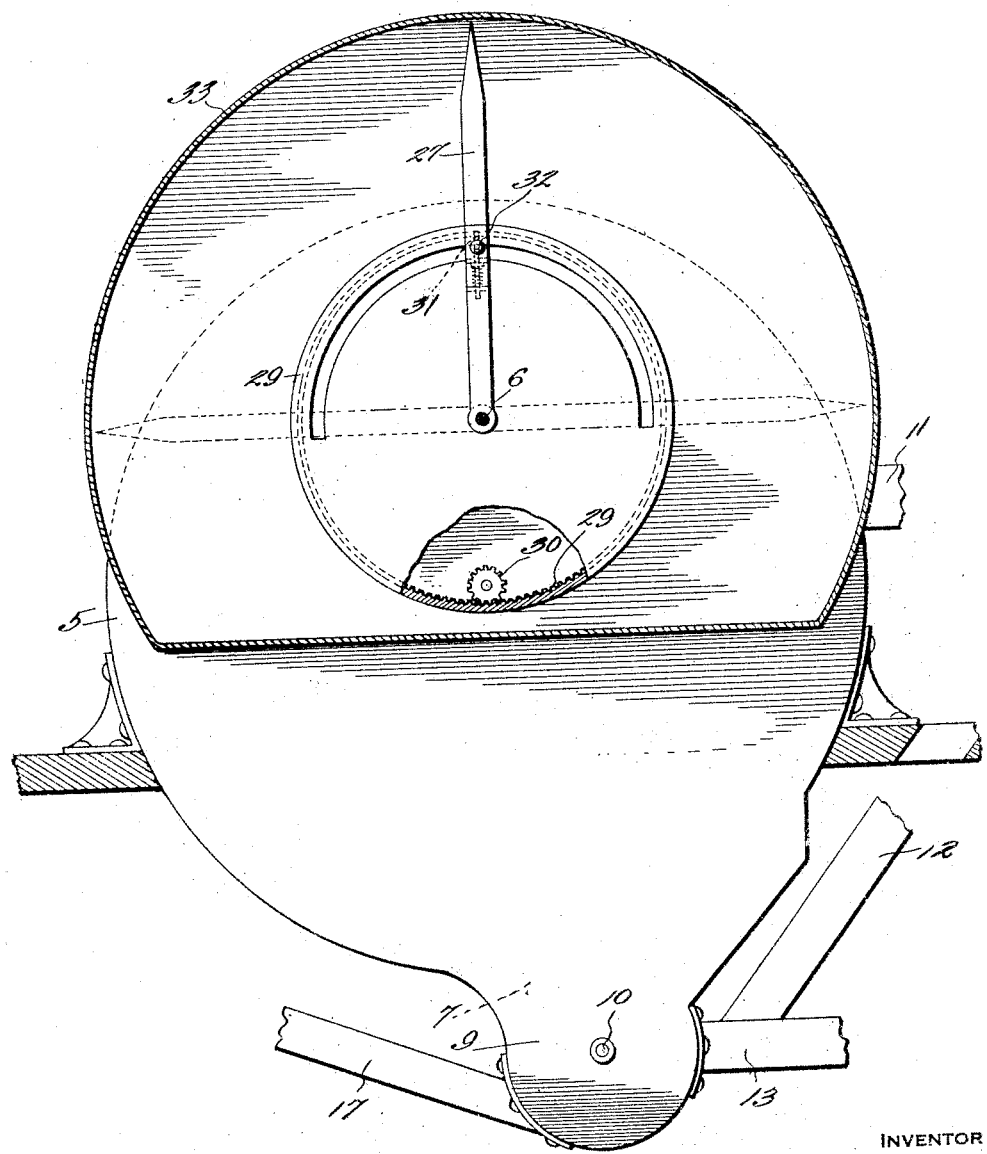

UNITED STATES PATENT OFFICE.

GEORGE M. CAGLE, OF TULSA, OKLAHOMA.

ROTARY SCALE.

1,257,186.      Specification of Letters Patent.      Patented Feb. 19, 1918.

Application filed May 15, 1917. Serial No. 168,860.

*To all whom it may concern:*

Be it known that I, GEORGE M. CAGLE, a citizen of the United States, residing at Tulsa, in the county of Tulsa and State of Oklahoma, have invented new and useful Improvements in Rotary Scales, of which the following is a specification.

This invention relates to rotary scales or weigher and has particular reference to a machine for weighing cotton seed, but which is also adapted for measuring and weighing various grains and like substances.

One of the objects of the invention resides in the provision of a rotary scale having a revoluble drum provided with a plurality of cups which are adapted to successively receive cotton seed until a predetermined amount has been supplied whereupon the drum will be tripped and allowed to rotate sufficiently far to discharge the filled cup and bring the next cup into position for filling.

Another object of the invention is to provide in a machine of this nature a pointer or indicator which will designate the quantity of material which has been fed through the machine.

The invention also aims to generally improve rotary scales to render them more practical, useful and commercially desirable.

With these and other objects in view as will become more apparent as the description proceeds, the invention consists in certain novel features of construction, combination and arrangement of parts as will be hereinafter fully described, illustrated and claimed.

In the drawings, Figure 1 is a side elevation partly broken away to disclose the internal mechanism of the scale.

Fig. 4 is a longitudinal sectional view on the plane of line 4—4 of Fig. 3.

Figure 1:
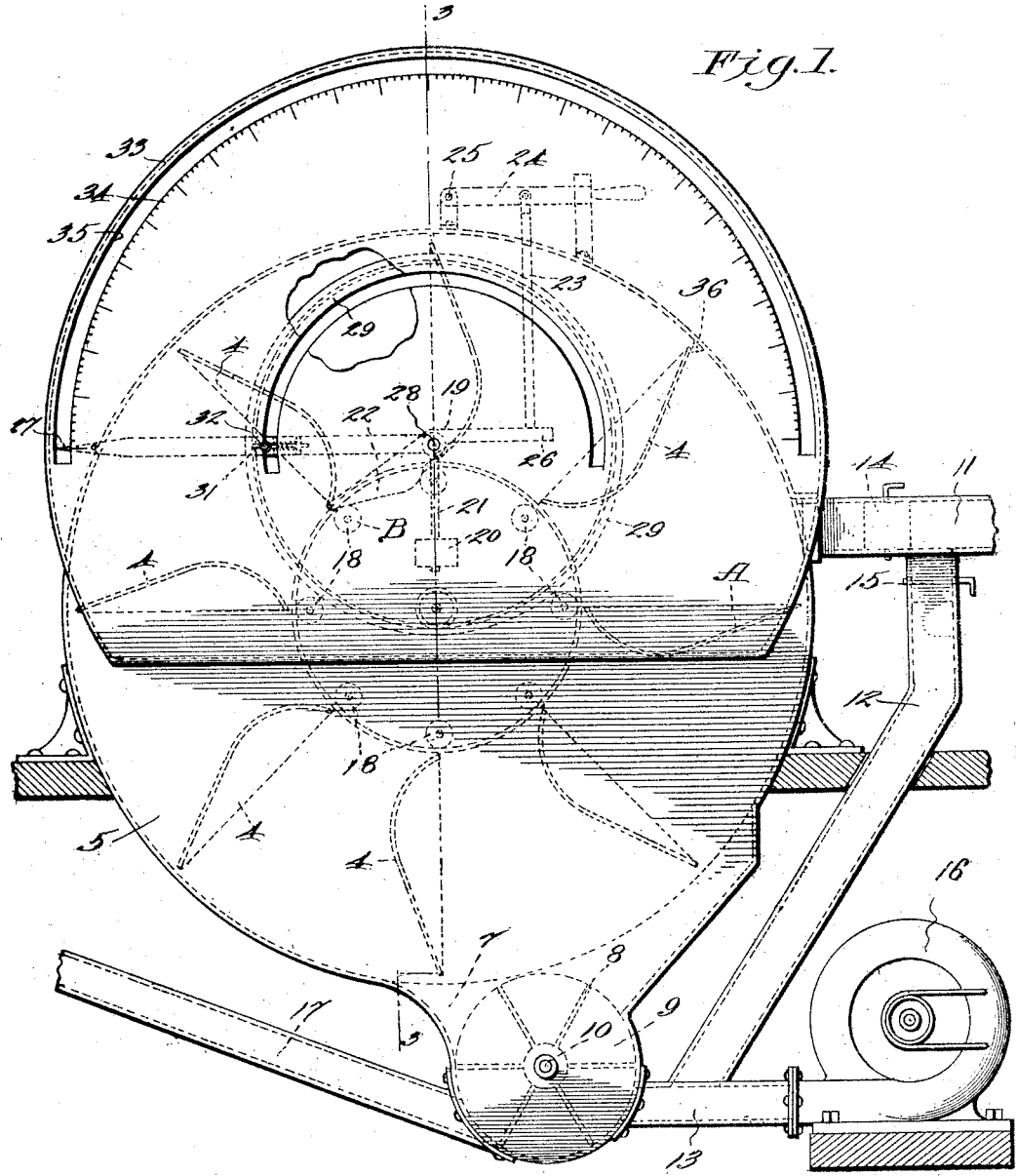
Figure 2:
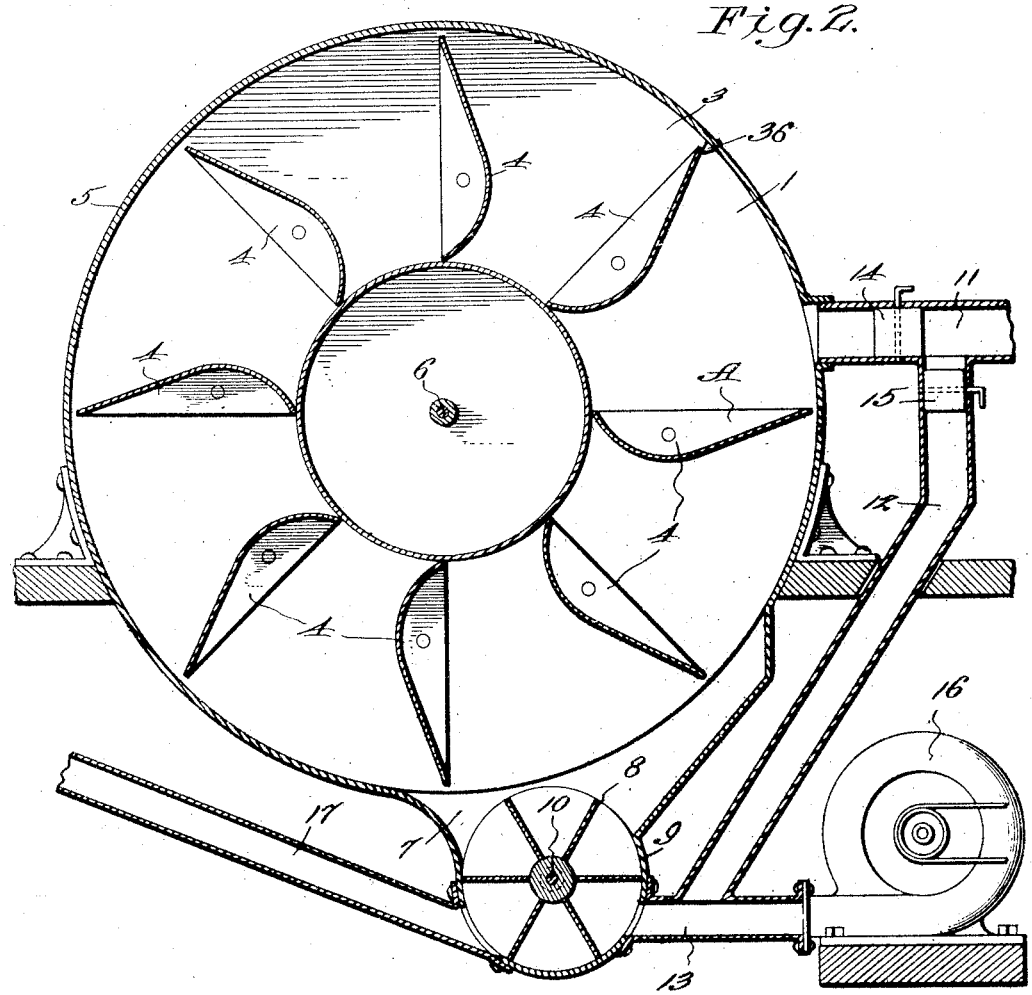
Fig. 2 is a longitudinal sectional view on the plane of line 2—2 of Fig. 3.
Figure 3:
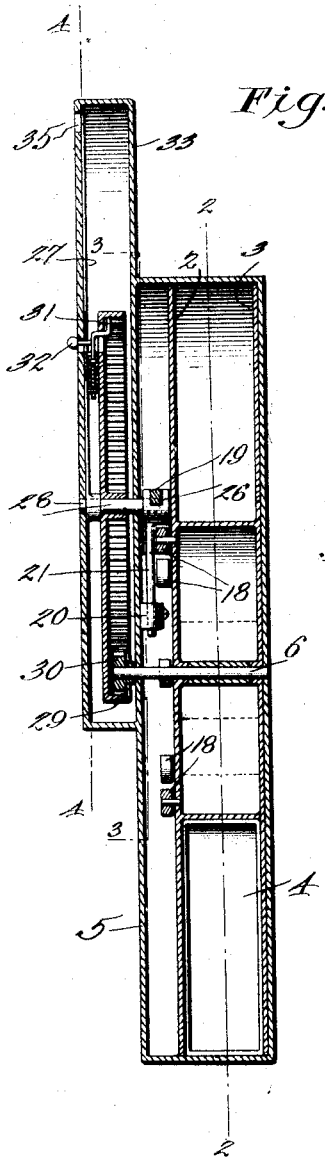
Fig. 3 is a transverse sectional view on the plane of line 3—3 of Fig. 1.
Figure 6:
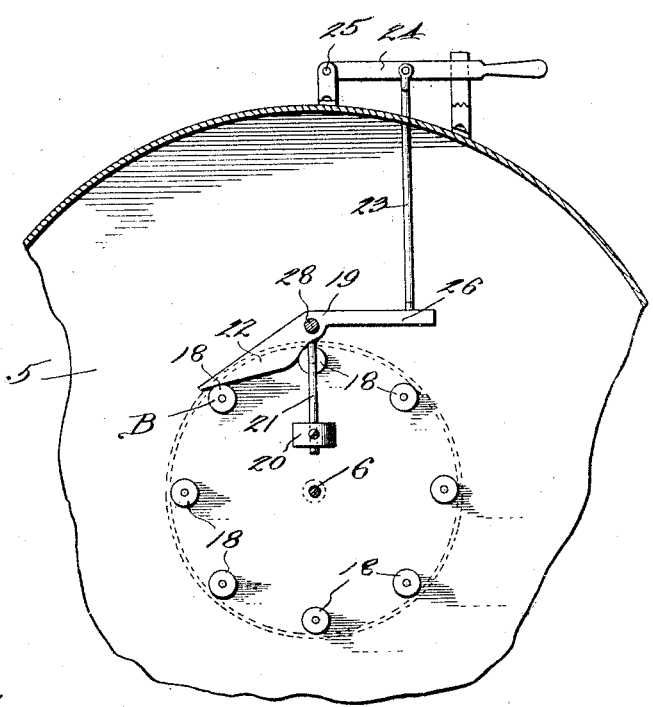
Fig. 6 is a sectional view taken on a longitudinal plane indicated by the line 3—3 of Fig. 3.
Figure 5:
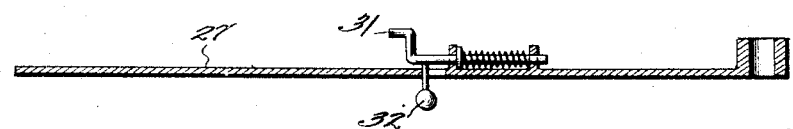
Fig. 5 is a detail view of the pointer and its locking mechanism.

Referring in detail to the drawings by numerals, 1 designates as an entirety a rotary receiving drum having heads 2 and 3 between which in radial alinement are secured a plurality of cups 4 adapted to successively receive the cotton seed which is to be weighed.

The drum is mounted within the housing 5 on a shaft 6 which is supported by the side walls of the housing. The housing is provided adjacent its lower end with a discharge opening 7, the passage of which is controlled by a rotary paddle wheel valve 8 having a suitable casing 9. The valve is secured to a shaft 10 which may be driven by any suitable means. Cotton seed or other material to be weighed is introduced into the housing 5 through a suitably arranged conveyer pipe 11. A by-pass 12 connects the conveyer 11 with the blast pipe 13 in advance of the valve 8 and, if desired, cotton seed or other material may be shunted through this pipe at such times when it is not desired to weigh the same. Valves or baffles 14 and 15 make it possible to direct the material in the desired direction, either through the bypass or into the housing 5. A blast fan 16 forces material through the discharge pipe 17 which leads to a seed house or other desired terminal.

The rotary drum is provided on its wall 2 with a plurality of laterally extending rollers 18 radially alined with the cups 4 and these rollers are adapted to engage the pivot beam 19 which is mounted intermediate its ends at 28 and which is equipped with a counter balanced weight 20 adjustably secured on the depending arm 21 fixed to the center of the beam. The arm 22 of the beam, by engaging one of the rollers 18 checks rotation of the drum until sufficient weight has been deposited in the cup to lift the arm 21 and allow the roller to pass.

For manually tripping or tilting the beam, which becomes desirable at certain times as will be hereinafter set forth, a push rod 23 is provided and pivotally connected to an arm or lever 24 which is pivoted as at 25. When the lever is forced downwardly, the push rod will, by contacting the arm 26 of the beam, raise the arm 19 out of the path of the rollers.

For registering the weight of material fed through the scale, I provide an indicator 27 which is pivoted at its inner end to the stub shaft 28, supporting the beam 19. 29 designates an internal ring gear supported as shown and driven by a gear or pinion 30 on the shaft 6 of the drum 1. The drum and pinion are both fixed to the shaft so that a revolution of the former will drive the ring gear 29 by the gear 30.

To cause the indicator to travel with the gear 29, I provide a spring pressed bolt or latch 31 carried by the indicator and adapted for engagement with the teeth of the gear 29. A knob 32 on the bolt 31 provides a convenient means for retracting the bolt to disengage it from the gear so as to allow the indicator to be moved independently thereof.

A secondary housing 33 incloses the gears and indicator. The front wall 34 serves as a dial and may be suitably graduated to cooperate with the indicator and designate the weight of material which has passed through the machine. The wall 34 is formed with an arcuate sight opening 35 so that the position of the pointer may be determined.

When it is desired to determine the weight of seed in a certain bale of cotton, the seeds are fed as the cotton is ginned, through the conveyer tube 11 into the housing 5 and are received in the cup A. As seed or grain is deposited in the cup A, the drum will be rotated proportionately. To cause the movement to be proportional, the arm of the beam is formed of suitable shape where it engages against the rollers.

The degree of movements is further governed by adjusting the weight 20 on the arm 21. Simultaneously with the movement of the drum, the indicator is moved through a corresponding space on the dial. The beam arm is shaped to release entirely the particular roller with which it is in engagement when the indicator has been moved through a unit division of the dial. When desired, I may affix to the interior of the housing 5 a spring stop 36 extending into the path of the cups and adapted to slightly check their movement at the proper point to permit the initial engagement of the beam arm against a particular roller. At each successive rotation of the drum, the indicator which is locked with the gear 29 will be moved along the dial and thus it may be determined at any time how much grain has passed through the scales. The ratio of the gears will be properly proportioned to give a correct weight reading on the dial.

Now in event that the last portion of seed from a bale does not fill a cup, it becomes necessary to manually trip or tilt the beam and this is done by means of the lever 24 and push rod 23 as before explained. After tripping by the manually operating mechanism, the drum is turned by swinging the pointer 27 to bring one of the pans in position for filling, then the pointer is disconnected from the gear 29 and returned to its zero position after which the scale is ready for the weighing of the seeds from a second bale as it is ginned.

It will be seen from the foregoing description and from the accompanying drawings, that I have devised a very efficient and practical rotary scale which is especially adapted for weighing cotton seed as it is ginned, but which will also be found useful for weighing grain and like material. While I have shown what I now consider the preferred embodiment of my invention, it is to be understood that I do not wish to be limited to this exact construction, but may from time to time, make such changes in arrangement and design as will suggest themselves.

What I claim is:—

1. In a rotary scale, the combination with a drum having a plurality of radially arranged cups adapted to successively receive material to be weighed, of a pivoted beam, a cam on the beam, and means carried by the drum for engaging against said cam to restrict the rotation of the drum, said cam adapted to be moved by said means on the drum to permit rotation of said drum to a degree determined by the amount of material in a cup.

2. In a rotary scale, the combination with a drum having a plurality of radially arranged cups adapted to successively receive material to be weighed, of a pivoted beam, a cam on the beam, means carried by the drum for engaging against said cam to restrict the rotation of the drum, said cam adapted to be moved by said means on the drum to permit rotation of said drum to a degree determined by the amount of material in a cup, a downwardly extending arm attached to said beam adjacent its pivot point, and a weight on said arm.

3. In a rotary scale, the combination with a drum having a plurality of radially arranged cups adapted to successively receive material to be weighed, of a pivoted beam, a cam on the beam, means carried by the drum for engaging against said cam to restrict the rotation of the drum, said cam adapted to be moved by said means on the drum to permit rotation of said drum to a degree determined by the amount of material in a cup, a downwardly extending arm attached to said beam adjacent its pivot point, a weight on said arm, a ring gear driven by said drum, an indicator pivoted at one end, and a latch carried by said indicator, said latch adapted to engage with the teeth of the gear to move the indicator.

4. In a rotary scale, a revoluble drum, a ring gear, an indicator pivoted at one end and a latch carried by said indicator for locking engagement with the teeth of the gear to cause the gear to actuate the indicator.

In testimony whereof I affix my signature.

GEORGE M. CAGLE.